(12) United States Patent
Bottorff (10) Patent No.: US 10,516,648 B2
(45) Date of Patent: Dec. 24, 2019

(54) ADDRESS TRANSLATION (71) Applicant: Hewlett Packard Enterprise Development LP, Houston, TX (US)

(72) Inventor: Paul A. Bottorff, Portola Valley, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/882,974

(22) Filed: Jan. 29, 2018

(65) Prior Publication Data

US 2019/0238502 A1    Aug. 1, 2019

(51) Int. Cl.
  H04L 29/12    (2006.01)
  H04L 12/749    (2013.01)
  H04L 12/715    (2013.01)
  H04L 29/06    (2006.01)

(52) U.S. Cl.
  CPC ............ H04L 61/251 (2013.01); H04L 45/04 (2013.01); H04L 45/64 (2013.01); H04L 45/741 (2013.01); H04L 61/106 (2013.01); H04L 69/18 (2013.01)

(58) Field of Classification Search
  None
  See application file for complete search history.

(56) References Cited

U.S. PATENT DOCUMENTS

| | | | |
|---|---|---|---|
| 7,535,856 B2 | 5/2009 | Booth et al. | |
| 7,865,586 B2 | 1/2011 | Cohn | |
| 8,743,879 B2 | 6/2014 | Haddad et al. | |
| 2004/0098512 A1 * | 5/2004 | Lin | H04L 29/12377 709/249 |
| 2008/0112404 A1 | 5/2008 | Kuri et al. | |
| 2013/0235862 A1 | 9/2013 | Kahng et al. | |
| 2014/0112349 A1 | 4/2014 | Moreno et al. | |
| 2014/0307629 A1 | 10/2014 | Liebsch | |
| 2017/0054758 A1 | 2/2017 | Maino et al. | |

(Continued)

FOREIGN PATENT DOCUMENTS

KR    20120061099    6/2012

OTHER PUBLICATIONS

Moy, J., "OSPF Version 2", Network Working Group, Request for Comments: 2328, Standards Track, Ascend Communications, Inc., Apr. 1998, pp. 1-244.

(Continued)

*Primary Examiner* — Anh Ngoc M Nguyen
(74) *Attorney, Agent, or Firm* — Rathe Lindenbaum LLP (57) ABSTRACT

A system may include a first network having a first communications protocol, a second network having a second communications protocol and at least one edge device in communication with the first network and the second network. The edge device may include a translator to translate a first address associated with the first network and based on the first communications protocol into a second address associated with the second network and based on the second communications protocol. The second address may include a first address portion based on a first fragment of the first address, a second address portion having a translation key based on a second fragment of the first address and a third address portion having a locator address.

20 Claims, 7 Drawing Sheets

(56) References Cited

U.S. PATENT DOCUMENTS

2017/0331746 A1\* 11/2017 Qiang ................... H04L 45/16
2018/0139123 A1\* 5/2018 Qiang ................. H04L 45/308

OTHER PUBLICATIONS

Lindem et al., "OSPFv3 Autoconfiguration", Internet Engineering Task Force (IETF), Request for Comments: 7503, Standards Track, Apr. 2015, pp. 1-15.
Fedyk et al., "IS-IS Extensions Supporting IEEE 802.1aq Shortest Path Bridging", Internet Engineering Task Force (IETF), Request for Comments: 6329, Standards Track, Apr. 2012, pp. 1-37.
Coltun et al., "OSPF for IPv6", Network Working Group, Request for Comments: 5340, Standards Track, Jul. 2008, pp. 1-94.
Callon, Ross W., "Use of OSI IS-IS for Routing in TCP/IP and Dual Environments", Network Working Group, Request for Comments: 1195, Digital Equipment Corporation, Dec. 1990, 68 pages.
Berger et al., "The OSPF Opaque LSA Option", Network Working Group, Request for Comments: 5250, Standards Track, Jul. 2008, pp. 1-17.
Herbert, T. et al., Identifier-locator Addressing for IPv6, (Research Paper), Mar. 13, 2017, 78 Pgs.
Zhou, L. et al., Implementing IPv6 as a Peer-to-Peer Overlay Network, (Research Paper), Feb. 25, 2203, Published in: Reliable Distributed Systems, 2002. Proceedings 21st IEEE Symposium, 5 Pgs.

\* cited by examiner

ADDRESS TRANSLATION

BACKGROUND

Many networks, for example, campus networks, connect together edge networks utilizing a number of different networking technologies such as, for example, wired or WIFI Ethernets and IPv4 and IPv6 subnets. Such networks may utilize an overlay/underlay architecture where a virtual network, the overlay network, is built on top of an underlying network infrastructure, the underlay network.

BRIEF DESCRIPTION OF THE DRAWINGS

Various examples will be described below by referring to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A system and method may be provided to route packets from an overlay network over an underlay network utilizing Identifier Locator Addressing (ILA) and the address format of the communication protocol (e.g., IPv6) of the underlay network. An overlay address associated with a packet may be translated and encoded into an address format of the underlay network with a translation key. The system and method may be used to build a sealed underlay network with zero configuration that is able to interconnect a range of different network technologies and to support the mobility of connected devices.

A system may comprise a first network having a first communications protocol, a second network having a second communications protocol and at least one edge device in communication with the first network and the second network. The edge device may comprise a translator to translate a first address associated with the first network and based on the first communications protocol into a second address associated with the second network and based on the second communications protocol. The second address may comprise a first address portion based on a first fragment of the first address, a second address portion having a transla-tion key based on a second fragment of the first address and a third address portion having a locator address.

A method may comprise receiving a packet from a first device in a first network having a plurality of devices and a first communications protocol. the packet having a first address and generating a second address for transmission of the packet over a second network having a second communications protocol by translating the first address into the second address. The second address may comprise a first address portion based on a first fragment of the first address, a second address portion having a translation key based on a second fragment of the first address and a third address portion having a locator address. The method may further comprise transmitting the packet over the second network to a second device.

Figure 1A:
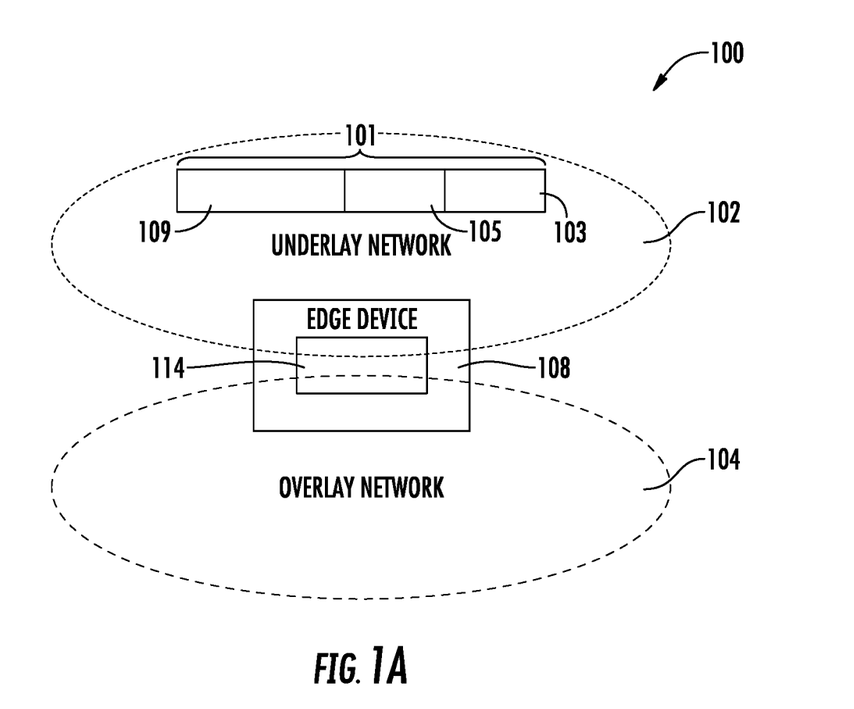
FIG. 1A is a block diagram of an example overlay/underlay network system.

A device may comprise an input for receiving a packet having a first address based on a first communications protocol and a translator to translate the first address into a second address based on a second communications protocol. The second address may comprise a first address portion based on a first fragment of the first address, a second address portion having a translation key based on a second fragment of the first address and a third address portion having a locator address. The device may further comprise an output for transmitting the packet based on the second address FIG. 1A is a block diagram of an example overlay/underlay network system. In FIG. 1A, a system 100 includes an underlay network 102, an overlay network 104 and an edge device 108 that resides at a boundary between the overlay network 104 and the underlay network 102. The edge device 108 allows for communication between the overlay network 104 and the underlay network 102. The edge device 108 includes a translator 114 that is used to translate an overlay address for the overlay network 104 into an underlay address 101 for the underlay network 102. The underlay address 101 has a format that includes a first address portion 103, a second address portion 105 and a third address portion 109. The operation of system 100, edge device 108 and translator 114 are discussed further below.

Figure 1B:
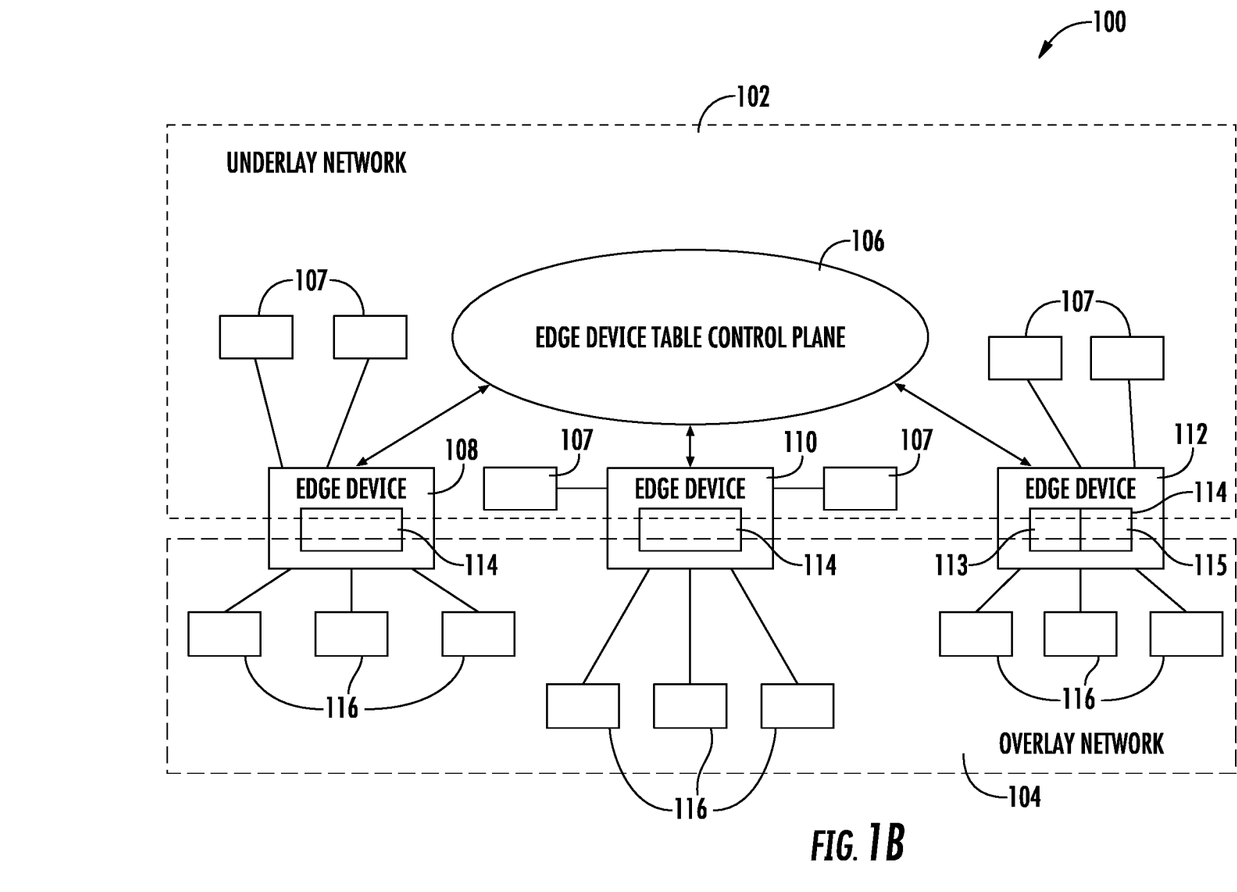
FIG. 1B is a block diagram of an example overlay/underlay network system.
Figure 1C:
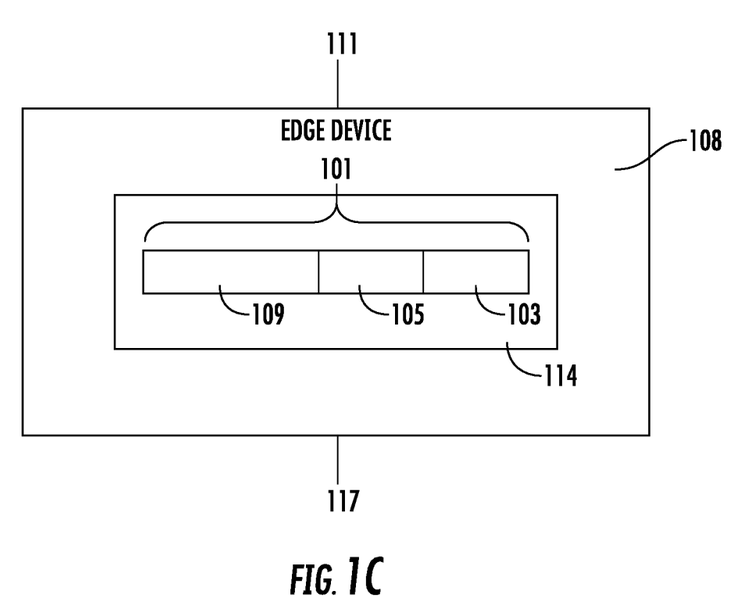
FIG. 1C is a block diagram of an example edge device.

FIG. 1B is a block diagram of an example overlay/underlay network system. In FIG. 1, the system 100 includes an underlay network 102, an overlay network 104 and an edge device table control plane 106. The underlay network 102 may contain a plurality of devices 107 such as bridges and routers. The underlay network 102 uses a communications protocol that may be used to forward packets of data over the underlay network 102. In one example, the underlay network communications protocol is Internet Protocol version 6 (IPv6). Overlay network 104 is in communication with the underlay network 102 using edge devices 108, 110 and 112 that, for example, reside at a boundary between the overlay network 104 and the underlay network 102. The overlay network 104 may be used to provide services using a communication protocol such as, for example, L2, IPv4 or IPv6. In an example, multiple overlay networks (not shown) may be in communication with the underlay network 102 and each may utilize a different communications protocol. Edge devices 108, 110 and 112 may be, for example, switches or routers. Each edge device 108, 110, 112 includes a translator 114 and are in communication with devices 116 (e.g., wired and wireless devices) in the overlay network 104 and devices 107 in the underlay network 102. FIG. 1C is a block diagram of an example edge device. In FIG. 1C, the example edge device 108 includes a translator 114 and at least one input 111 and at least one output 117. In an example, edge devices 108 includes a plurality of inputs and outputs to receive packets and transmit packets, respectively. As mentioned above, the translator 114 is used to translate an overlay address into an underlay address 101 that has a format that includes a first address portion 103, a second address portion 105 and a third address portion 109. As discussed further below, edge device 108 includes a first database including table information associating translations keys to overlay addresses and a second database including table information associating overlay addresses to locator addresses for the underlay network 102 (shown in FIGS. 1A and 1B).

Returning to FIG. 1B, to forward packets from the overlay network 104 over the underlay network 102, the format of an address for a packet used in the underlay network 102 (e.g., an underlay address) is designed to allow encoding of an overlay address from the overlay network 104 into the underlay address. In an example, Identifier Locator Addressing (ILA) may be utilized with the underlay address format of the communications protocol (e.g., IPv6) of the underlay network 102. As discussed further below, each translator 114 in an edge device 108, 110, 112 may be used to translate an overlay address (or first address) of a packet from the overlay network 104 into the address format (or second address) of the underlay network 102 with a translation key. The underlay address includes two parts, an identifier address and a locator address. The identifier address specifies an overlay entity and the locator address identifies a specific location (e.g., an edge device) on the underlay network. Translator 114 may be a function within an edge device 108, 110, 112 and may be implemented, for example, in hardware or software in the edge device 108, 110, 112. Translator 114 may be used to translate an overlay address into the address format of an underlay network 102 at ingress to the underlay network 102 and may be used to translate the underlay address into an overlay address at egress from the underlay network 102. In one example, a translator 114 may include a first translator 113 to translate the overlay address into the underlay address and a second translator 115 to translate the underlay address into an overlay address. System 100 also includes an edge device table control plane 106 in communication with edge devices 108, 110 and 112. The edge device table control plane 106 may be used to distribute the first and second databases to all of the edge devices (e.g., edge device 108, 110, 112) using, for example, a learning method where the translation key and locator address information is distributed by learning from ongoing packet exchange link, a push control plane method (e.g., IS-IS (Intermediate System to Intermediate System) which distributed all the table data throughout the network as part of a distributed database protocol, or a pull control method (e.g., LISP) which builds a separate database containing the translation key and locator address information that is then queried on demand.

Figure 2:
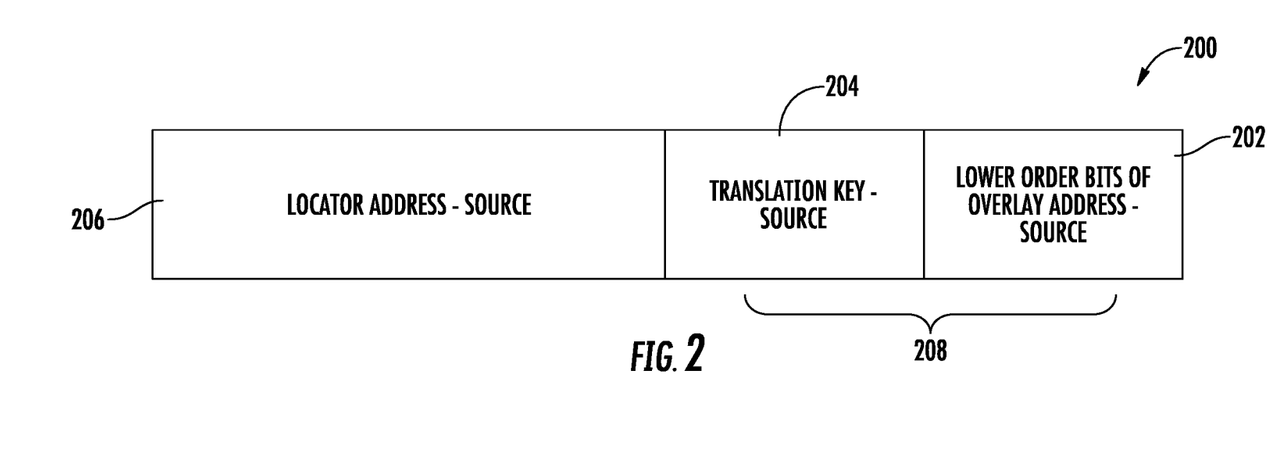
FIG. 2 is a block diagram of an example address format for a source address for an underlay network.
Figure 3:
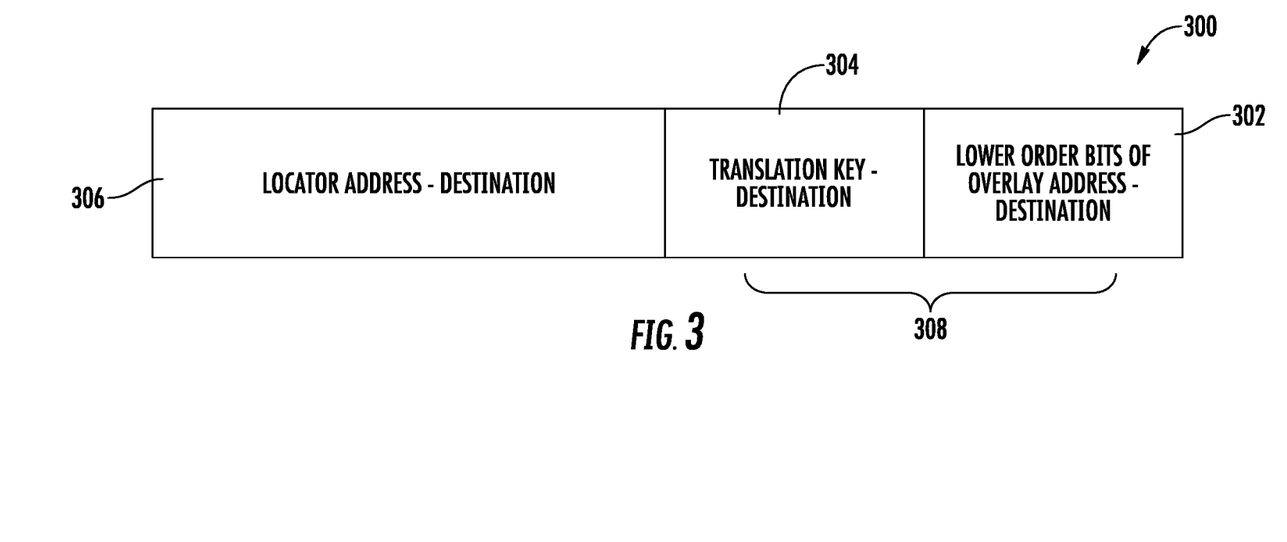
FIG. 3 is a block diagram of an example address format for a destination address for an underlay network.

FIG. 2 is a block diagram of an example address format for a source address for an underlay network and FIG. 3 is a block diagram of an example address format for a destination address for an underlay network. In FIG. 2, the underlay address format 200 for an overlay source address includes a first portion 202 of the address for encoding a first fragment of the overlay address, a second portion 204 of the address for encoding a translation key associated with a second fragment of the overlay address and a third portion 206 of the address for encoding an underlay locator address. The first portion 202 and the second portion 204 of the address form an identifier address 208 for the overlay entity. The format of the underlay address 200 is independent of the communications protocol utilized by the overlay network 104. In FIG. 3, the underlay address format 300 for an overlay destination address includes a first portion 302 of the address for encoding a first fragment of the overlay address, a second portion 304 of the address for encoding a translation key associated with a second fragment of the overlay address and a third portion 306 of the address for encoding an underlay locator address. The first portion 202 and the second portion 204 of the address form an identifier address 308 for the overlay entity. The format of the underlay address 300 is independent of the communications protocol utilized by the overlay network 104.

In FIGS. 2 and 3, the first fragment of the overlay address encoded in the first portion 202, 302 of the underlay address is a set of lower order bits (e.g., high entropy bits) from the overlay address. The second fragment of the overlay address used to identify the translation key encoded in the second portion 204, 304 of the underlay address are the bits of the overlay address remaining after removal of the first fragment of the overlay address (e.g., the lower order bits). The translation key may be identified using a distributed database, for example, the first database described above with respect to the FIG. 1. The locator address encoded in the third portion 206, 306 of the underlay address is used to route a packet to and from ingress points and egress ports of edge devices 108, 110, 112 (shown in FIG. 1) over the underlay network 102. The locator address encoded in the third portion 206, 306 of the underlay address addresses the edge device associated with the overlay address and may be determined using a distributed database, for example, the second database described above with respect to the FIG. 1. In one example, the format of the locator address may include a local or global prefix, an area prefix, a router ID, a path ID, a module number and a port number. In an example, the system 100 may automatically generate the locator addresses.

In one example, the addresses 200, 300 are based on an IPv6 packet format which includes a 128-bit destination and source address. In this example, the first portion 202, 302 of the address 200, 300 includes 32 bits that are used to encode the set of lower order bits from the overlay address. The set of lower order bits may be, for example, the highest entropy bits. In this example, the second portion 204, 304 of the address 200, 300 includes 32 bits used to encode a translation key. In one example, the translation key may include 3 bits for an identifier of the overlay network communications protocol. The lower 64 bits of the addresses 200, 300 (the first 202, 302 and second portions 204, 304 of the address) encode the overlay address (e.g., the identifier address 208, 308). The third portion 206, 306 of the address 200, 300 may include 64 bits to encode a locator address for the underlay network 102. In one example, the overlay address may be compressed by translating the overlay address into the translation key and set of lower order bits that are encoded in the first 202, 302 and second 204, 304 portions of the underlay address (e.g., the lower 64-bits of the address).

Figure 4A:
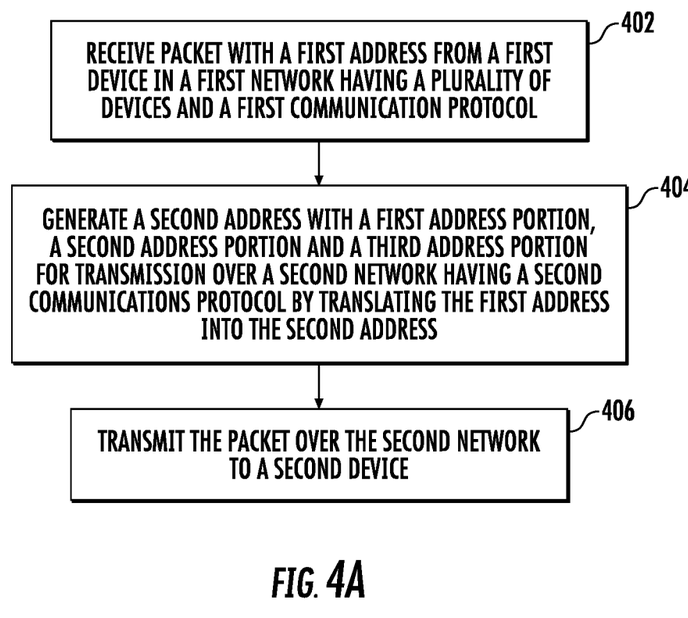
FIG. 4A is an example flowchart of a method for translating an overlay address into an underlay address upon ingress to an underlay network.
Figure 4B:
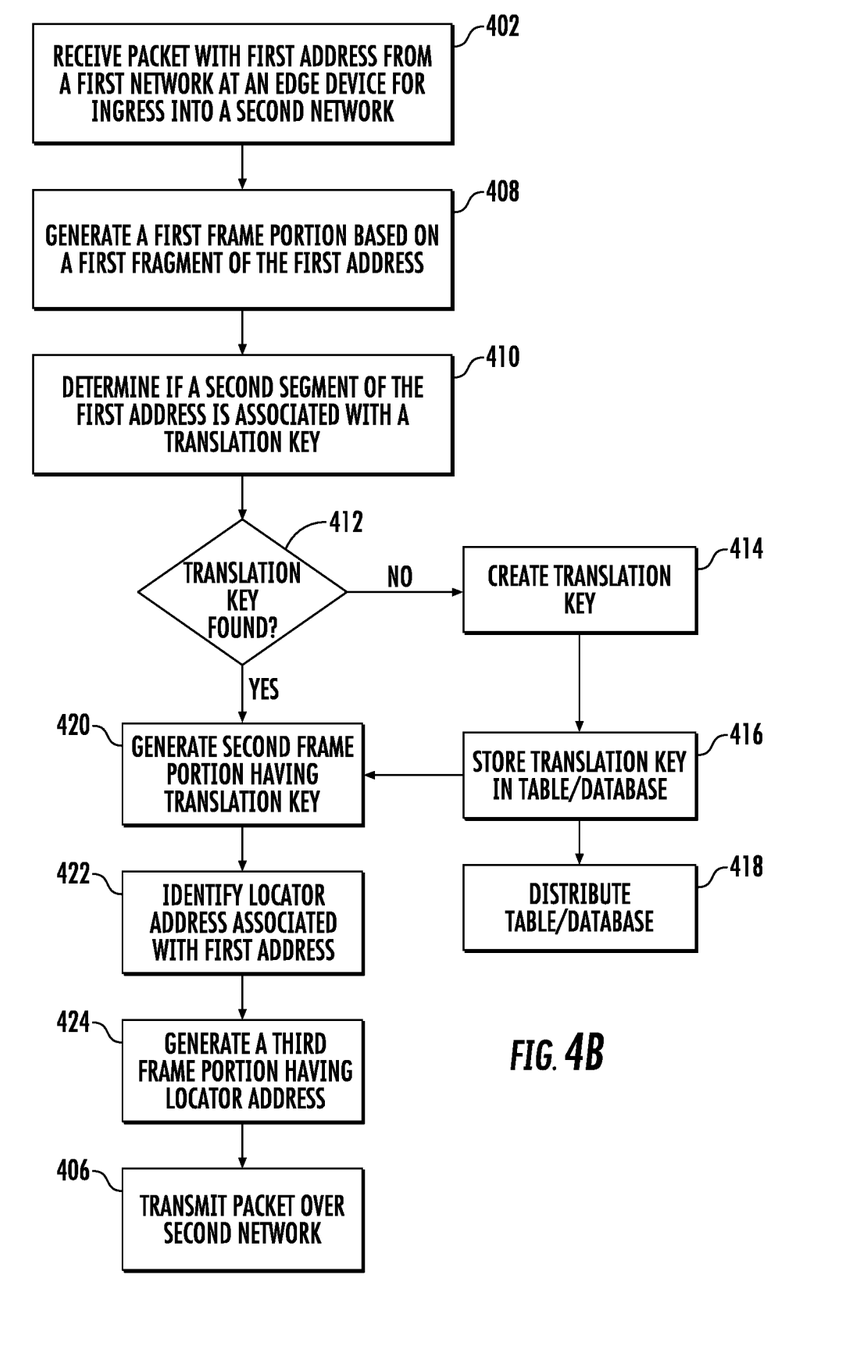
FIG. 4B is an example flowchart of a method for translating an overlay address into an underlay address upon ingress to an underlay network.

Returning to FIG. 1, translator 114 is used to translate the overlay address and encode the translation into the first and second portion of the underlay address. FIG. 4A is an example flowchart of a method for translating an overlay address into an underlay address upon ingress to an underlay network. At block 402, a packet with a first address is received from a first device in a first (or overlay) network that has a first communications protocol and a plurality of devices. At block 404, a second address is generated by translating the first address into a second address that has first address portion, a second address portion and a third address portion for transmission over a second (or underlay)

network. The second network has a second communications protocol. At block 406, the packet is transmitted over the second network to a second device. The generation of the second address is described further below with respect to FIG. 4B.

FIG. 4B is an example flowchart of a method for translating an overlay address into an underlay address upon ingress to an underlay network. At block 402, as mentioned above a packet with an overlay address is received from a first (or overlay) network at an edge device for ingress into a second (or underlay) network. A first address portion for an underlay address format is generated at block 408 by encoding a first fragment of the overlay address in the first address portion. In one example, the underlay address format is based on the IPv6 protocol (e.g., a 128-bit address). The first fragment of the overlay address encoded in the first address portion may be a set of lower order bits (e.g., highest entropy bits) from the overlay address. At block 410, it is determined whether a second fragment of the overlay address is associated with a translation key. The second fragment of the overlay address are the bits of the overlay address remaining after removal of the first fragment of the overlay address (e.g., the lower order bits). The translation key may be identified using a distributed database, for example, the first database described above with respect to FIG. 1, that includes a table of translation keys and the address fragments associated with each translation key. If a translation key is found at block 412, the method proceeds to block 420 to generate a second address portion with the translation key.

At block 422, a locator address is identified that is associated with the underlay address. The locator address may be identified using a distributed database, for example, the second database described above with respect to the FIG. 1 that includes a table of locator addresses and the overlay addresses associated with each locator address. At block 424, a third address portion is generated with the identified locator address. At block 406, as mentioned above the packet is transmitted over the second network based on the underlay address.

Figure 5:
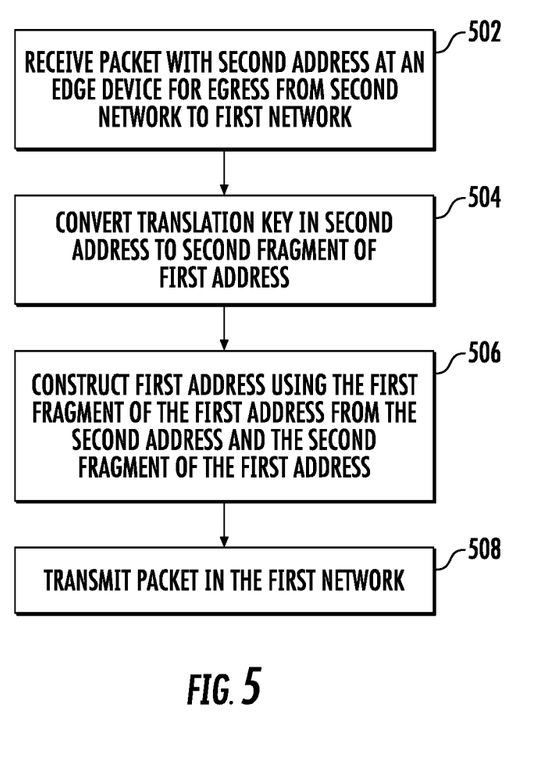
FIG. 5 is an example flowchart of a method for translating an underlay address into an overlay address upon egress from an underlay network.

Returning to block 412, if a translation key is not found, the method proceeds to bock 414. At block 414, a translation key is created, and the translation key and its associated overlay address fragment are stored in a translation key database at block 416, for example, the first database described above with respect to FIG. 1. At block 418, a control plane may be used to distribute the translation key database to each edge device in the overlay network. Also, the database used for identifying the locator address associated with the overlay address may also be distributed to each edge device in the overlay network. The translation key database and the database for identifying the locator address may be distributed using, for example, a distributed database technique using link state routing such as IS-IS (Intermediate System to Intermediate System), a learning method or a pull method (e.g., LISP) as described above. Once the translation key is created (block 414) and stored (416), the second portion of the second address may be generated at block 420 with the translation key. At block 422, a locator address is identified that is associated with the underlay address. The locator address may be identified using a distributed database, for example, the second database described above with respect to the FIG. 1 that includes a table of locator addresses and the overlay addresses associated with each locator address. At block 424, a third address portion is generated with the identified locator address. At block 406, as mentioned above the packet is transmitted over the second network based on the underlay address FIG. 5 is an example flowchart of a method for translating an underlay address into an overlay address upon egress from an underlay network. At block 502, a packet is received at an edge device from the second (or underlay) network for egress from the second network to the first (or overlay) network. The packet has an address in the format described above with respect to FIGS. 1-3. At block 504, a translation key encoded in the underlay address is converted or translated to the second fragment of the overlay address. The fragment of the overlay address may be identified using a distributed database, for example, the first database described above with respect to FIG. 1, that includes a table of translation keys and the address fragments associated with each translation key. At block 506, the overlay address is reconstructed using the second fragment recovered from the translation key and the first fragment of the overlay address that is encoded in the underlay address, e.g., a first portion of the underlay address. At block 508, the packet is transmitted in the first (or overlay) network.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

I claim:
1. A system comprising:
a first network having a first communications protocol;
a second network having a second communications protocol;
at least one edge device in communication with the first network and the second network,
the edge device comprising a software translator to translate a first address associated with the first network and based on the first communications protocol into a second address associated with the second network and based on the second communications protocol,
the second address comprising:
a first address portion based on a first fragment of the first address;
a second address portion having a translation key based on a second fragment of the first address; and
a third address portion having a locator address.
2. The system according to claim 1, wherein the first network is an overlay network and the second network is an underlay network.
3. The system according to claim 1, wherein the second communications protocol is an IPv6 protocol.
4. The system according to claim 1, wherein the first fragment of the first address is a set of lower order bits.

5. The system according to claim 4, wherein the second fragment of the first address comprises a set of bits remaining after removal of the set of lower order bits from the first address.

6. The system according to claim 1, wherein the at least one edge device includes a plurality of edge devices and the system further comprises a control plane coupled to the plurality of edge devices, the control plane to distribute a first database and a second database to each of the plurality of edge devices, the first database associating the translation key with the second fragment of the first address and the second database associating the locator address with the first address.

7. The system according to claim 1, wherein the software translator further to translate the first and second address portions of the second address associated with the second network to the first address associated with the first network.

8. A method comprising:
receiving a packet from a first device in a first network having a plurality of devices and a first communications protocol, the packet having a first address;
generating a second address for transmission of the packet over a second network having a second communications protocol by translating the first address into the second address, the second address comprising:
a first address portion based on a first fragment of the first address;
a second address portion having a translation key based on a second fragment of the first address; and
a third address portion having a locator address; and
transmitting the packet over the second network to a second device.

9. The method according to claim 8, wherein the first network is an overlay network and the second network is an underlay network.

10. The method according to claim 8, wherein the second communications protocol is an IPv6 protocol.

11. The method according to claim 8, the first fragment of the first address is a set of lower order bits.

12. The method according to claim 11, wherein the second fragment of the first address comprises a set of bits remaining after removal of the set of lower order bits from the first address.

13. The method according to claim 8, the translation key is associated with the second fragment of the first address using a first database.

14. The method according to claim 13, wherein the locator address is associated with the first address using a second database.

15. The method according to claim 8, further comprising:
receiving the packet with the second address at the second device;
converting the translation key in the second address portion to the second fragment of the first address using a first database;
constructing the first address from the first fragment of the first address in the first portion of the second address and the second fragment of the first address; and
transmitting the packet in the first network based on the first address.

16. A device comprising:
an input for receiving a packet having a first address based on a first communications protocol;
a software translator to translate the first address into a second address based on a second communications protocol,
the second address comprising:
a first address portion based on a first fragment of the first address;
a second address portion having a translation key based on a second fragment of the first address; and a third address portion having a locator address; and
an output for transmitting the packet based on the second address.

17. The device according to claim 16, wherein the wherein the second communications protocol is an IPv6 protocol.

18. The device according to claim 16, wherein the first fragment of the first address is a set of lower order bits.

19. The device according to claim 18, wherein the second fragment of the first address comprises a set of bits remaining after removal of the set of lower order bits from the first address.

20. The device according to claim 16, wherein the software translator further to translate the first and second address portions of the second address to the first address.

* * * * *